United States Patent [19]

Beesley

[11] Patent Number: 5,123,008

[45] Date of Patent: Jun. 16, 1992

[54] SINGLE FREQUENCY TIME DIVISION DUPLEX TRANSCEIVER

[75] Inventor: Graham E. Beesley, Winchester, England

[73] Assignee: Shaye Communications Limited, Winchester, England

[21] Appl. No.: 322,059

[22] Filed: Mar. 13, 1989

[30] Foreign Application Priority Data

Mar. 16, 1988 [GB] United Kingdom ............... 8806194

[51] Int. Cl.⁵ .................... H04L 5/14; H04B 1/56; H04B 1/40

[52] U.S. Cl. ...................................... 370/29; 455/86; 370/24

[58] Field of Search ................... 370/29, 109, 32, 32.1, 370/24, 27; 455/76, 78, 83, 84, 86, 79, 82, 87

[56] References Cited

U.S. PATENT DOCUMENTS

| | | | |
|---|---|---|---|
| 3,983,484 | 9/1976 | Hodama | 455/86 X |
| 4,037,158 | 7/1977 | Eastmond | 370/29 |
| 4,238,850 | 12/1980 | Vance | 370/27 |
| 4,430,756 | 2/1984 | Dolman et al. | 455/78 |
| 4,520,474 | 5/1985 | Vilmur | 455/76 X |
| 4,525,835 | 6/1985 | Vance et al. | 455/86 X |
| 4,542,531 | 9/1985 | Fukumura | 455/86 |
| 4,633,511 | 12/1986 | Koga et al. | 455/86 |
| 4,644,524 | 2/1987 | Emery | 370/29 |
| 4,903,257 | 2/1990 | Takeda et al. | 455/86 X |

FOREIGN PATENT DOCUMENTS

| | | | |
|---|---|---|---|
| 2188212 | 9/1987 | United Kingdom | 370/29 |
| 2196514 | 4/1988 | United Kingdom | 370/29 |

Primary Examiner—Douglas W. Olms
Assistant Examiner—H. Kizou
Attorney, Agent, or Firm—Wenderoth, Lind & Ponack

[57] ABSTRACT

A time division duplex transceiver incorporating a dual conversion superheterodyne receiver, and in which the first receiver local oscillator doubles as the frequency source for the transmitter. The oscillator is a voltage controlled oscillator VCO forming part of a mixer-type phase locked loop. Frequency deviation in the loop is achieved by mixing the VCO output with a selected harmonic of the output of the second receiver local oscillator. The reference oscillator is a crystal controlled oscillator whose output is switched as between transmit mode and receive mode at a switch before being passed to the loop phase detector. The transceiver is able to rapidly and repeatedly alternate between transmit and receive modes and is thus well suited to time division multiplex operation.

12 Claims, 1 Drawing Sheet

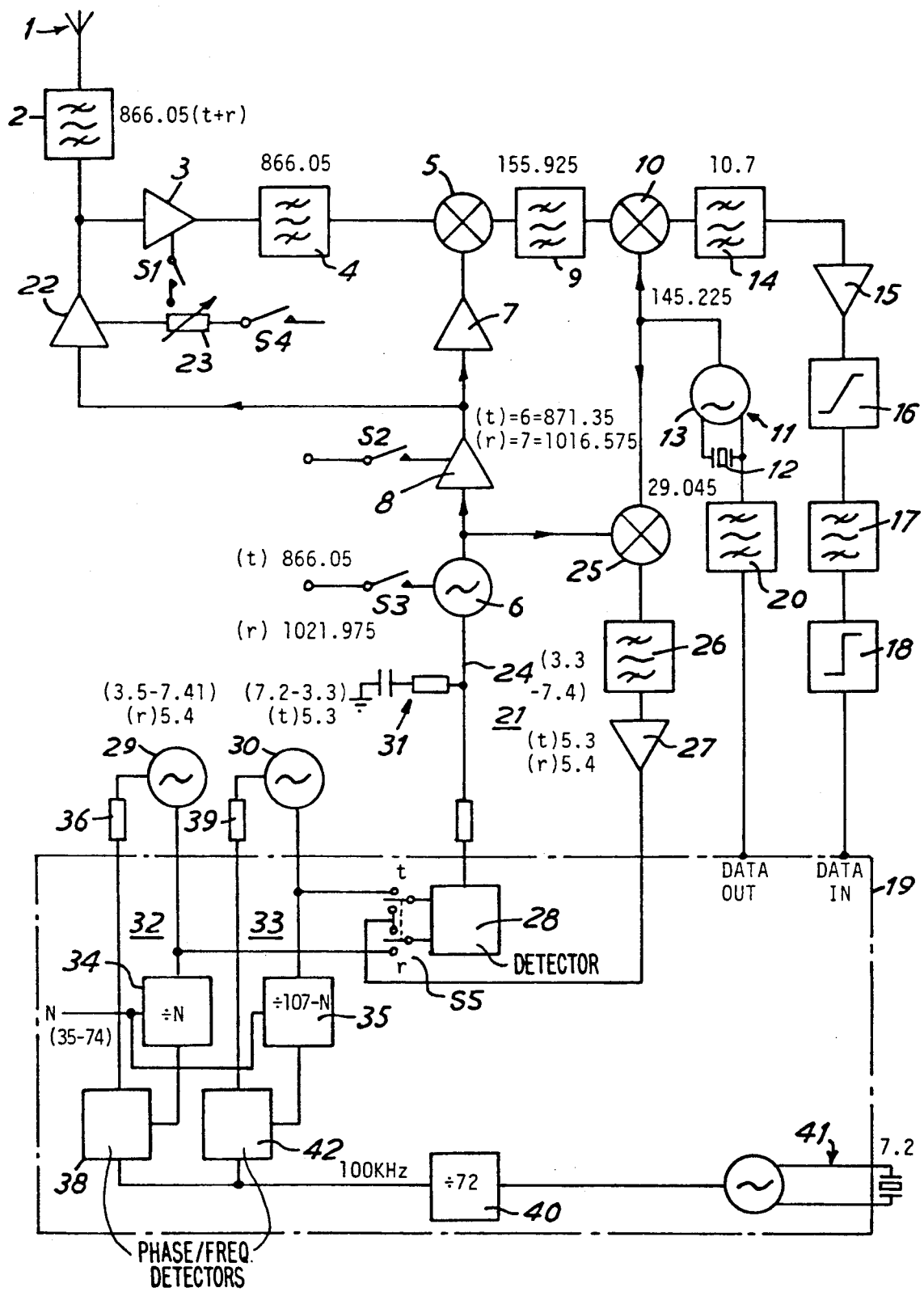

SINGLE FREQUENCY TIME DIVISION DUPLEX TRANSCEIVER

BACKGROUND OF THE INVENTION

This invention relates to transceivers used for time division duplex transmission and reception.

In time division duplex systems, transmission and reception are on the same frequency, separated on a time multiplex basis. This is achieved by grouping data bits to be transmitted into "packets", each containing identity information followed by the data. Usually the data takes the form of a digitized speech waveform. Once grouped into packets, each such packet is time compressed into slightly less than half its original length and is then transmitted. In the interval between the sending of each time compressed packet, a corresponding "receive" packet is transmitted from the other end. Upon reception the packets are expanded to form a continuous signal. Typically these packets may have 375 μS duration, this including the time taken to change over from transmission to reception and vice versa, the actual data part occupying about 312.5 μS consisting of 25 data bits, each of 12.5 μS duration.

In the present invention, advantage is taken of the fact that transmission and reception alternate and are never simultaneous to utilize a number of parts common to both the transmit and receive functions and to incorporate switch means to switch the parts concerned between the two functions. Thus, in the transceiver of the invention there is no separate transmitter and receiver, but only alternating transmit and receive configurations. This leads to a reduction in complexity and also avoids some of the difficulties of separate functions.

The transceiver to be described is a superheterodyne receiver and associated FSK transmitter. The receiver may be configured in multi-conversion modes, such as the dual conversion receiver to be described in detail below.

SUMMARY OF THE INVENTION

In an embodiment of the invention, the receiver section is of the superheterodyne type and comprises a local oscillator and a mixer, and IF stage, said mixer receiving an incoming signal from an aerial and a signal from the local oscillator, which signals are mixed to produce a difference frequency for application to the IF stage, and the transmitter section comprises an oscillator which is common to the local oscillator in the receiver section and an RF amplifier for amplifying the output of said oscillator for application to the aerial.

Preferably the local oscillator is switchable between a first frequency for receive and a second frequency for transmit, and the frequency difference between said first frequency and said second frequency is equal to the frequency of the IF stage, or a multiple thereof.

Frequency control of the local oscillator may be achieved by realizing the local oscillator as a voltage controlled oscillator (VCO) forming part of a phase locked loop. The loop is of conventional type, comprising a phase detector for detecting the phase difference between a first input derived from the output of the VCO and a second input derived from a reference oscillator, and a loop filter for low pass filtering the output of said phase detector for application to the frequency control input of said VCO. The loop reference oscillator may for example take the form of a crystal controlled oscillator having switchable output frequencies for transmit and receive. In order to cater for the different VCO output frequencies on transmit and receive, the reference oscillator in a preferred embodiment, comprises two further phase locked loops, each loop incorporating a programmable divider whose division ratio is set, one for transmit and one for receive, and switch means for selecting the output from one or the other of said further phase locked loops depending upon whether the transceiver is in transmit mode or receive mode for application to the main phase locked loop.

The preferred embodiment of the invention is one in which the receiver section is of the dual conversion type. In an embodiment, the main phase locked loop is of the mixer type and additionally incorporates a mixer which mixes the VCO output frequency with the output from a further oscillator, and filter means for filtering the frequency difference output from said mixer for application to the phase detector. Preferably the further oscillator is the second local oscillator of the dual conversion receiver section. When in transmit mode, this oscillator (the receiver second local oscillator) is frequency (fsk) modulated with the signal to be transmitted, and this modulation is thus transferred to the main phase locked loop to thereby modulate the VCO.

Thus it will be seen that both local oscillators of the receiver section are common to the transmitter section.

BRIEF DESCRIPTION OF THE DRAWING

In order that the invention may be better understood, an embodiment thereof will now be described by way of example only and with reference to the accompanying drawing which is a block diagram of a transceiver constructed in accordance with the invention.

DESCRIPTION OF THE PREFERRED EMBODIMENT

Referring to the drawing, the transceiver comprises a dual conversion superheterodyne receiver and an FSK transmitter. The primary intended usage is as a transceiver for use in a cordless telephone system. These systems are able to operate in a band of forty 100 KHz bandwith channels lying between 864.15 MHz and 868.05 MHz. At any given time a transceiver operates on just one channel, the transmit and receive frequencies being, as mentioned above, identical. By way of example, the operation of the transceiver will be described by reference to operation on just one mid-band channel at 866.05 MHz, but it will be understood that the same principles apply to the other channel frequencies and, indeed, any other frequency.

The receive signal path will first be described. The signal is received on an aerial 1 and is subject to prefiltering in an RF filter 2 before being passed to an RF preamplifier 3. The RF preamplifier is switched between transmit and receive functions by means of a switch S1 in order to avoid overload of the input receive circuitry on transmit. From the preamplifier 3, the RF signal is further filtered by a premixer filter 4 before being applied to the input of the first mixer 5. Here the incoming signal is mixed with the output of the first local oscillator 6 whose output is buffered by buffer amplifiers 7 and 8. The oscillator 6 is common to receive and transmit functions; on receive, its output frequency is 1021.975 MHz and on transmit its output frequency is 866.05 MHz. The operation of the oscillator 6 is described in greater detail below. The buffer 8 is used to mask out the movement of the oscillator 6 between transmit and receive by means of a switch S2 which is operable to switch the buffer off during this movement to prevent frequency originated sideband splatter.

The local oscillator frequency of 1021.975 MHz and the incoming frequency mix down to the first IF frequency of 155.925 MHz at the output of mixer 5. Filtering of the signal is carried out by a first IF filter 9 before it is passed to the second mixer 10 for conversion to the second IF frequency of 10.7 MHz. This is achieved by mixing in mixer 10 with the output frequency of a second local oscillator 11. The oscillator 11 is a crystal controlled oscillator comprising a 29.045 MHz crystal 12 and multiplier 13 which takes the 5th harmonic at 145.225 MHz for application to the second mixer 10.

The output from the second mixer 10 is filtered by a second IF filter 14, amplified by a second IF amplifier 15 and frequency discriminated by a discriminator 16 which detects the FSK data. This is further filtered by a post detection filter 17 and sliced by a data slicer 18 before being applied as fully shaped digital data to a data processor 19. The data processor 19 is a multi-function unit which, inter alia, takes the output from the data slicer 18 and converts it back into an analog waveform for AF amplification and application to an earphone or loudspeaker (not shown).

The transmit signal path will now be described. The data processor 19 is used to prepare a digital data signal from the input analog (speech) waveform. The data output from data processor 19 is applied to a shaping filter 20 where it is filtered before being applied to the crystal oscillator 11 to frequency modulate same. Typically the f.m. deviation is $-/-500$ Hz which latter is multiplied by 5 in multiplier 13 to give an output deviation of $+/-2.5$ KHz. The sixth harmonic of this signal is used to frequency modulate a main phase lock loop 21, including the oscillator 6, as will be described in detail below. By this time the total deviation is $6 \times 2.5 = /-15$ KHz. For transmit the oscillator 6 is switched by means of a switch S3 to a frequency of 866.05 MHz. The output of oscillator 6 is buffered, as before by buffer amplifier 8 and is amplified in power amplifier 22. The output of power amplifier 22 is passed via filter 2 to aerial 1. An anti-splatter attenuator 23 is switched into circuit on transmit by switch S4 and is operable to provide slow (10 μS) transients to the transmitter on/off switching action so as to reduce the splattering by the transmitter amplitude modulated sidebands into adjacent channels.

The frequency control arrangement of the transceiver will now be described:-

Oscillator 6 takes the form of a frequency switchable UHF voltage control oscillator (VCO). The oscillator can be switched by switch S3 to oscillate about a center frequency of 866.05 MHz for transmit, or 1021.975 MHz for receive. On transmit, the oscillator is frequency (FSK) modulated by the signal from oscillator 11 at a deviation of $+/-15$ KHz. On both transmit and receive, the output frequency of the oscillator 6 is controlled by a control voltage on a control line 24. To achieve this control, the oscillator 6 forms part of a mixer-type phase lock loop 21. The phase lock loop comprises, in addition to oscillator 6, a mixer 25 which takes the output of the oscillator 6 and mixes it with a harmonic of the output signal of oscillator 11, a filter 26 which selects the appropriate difference frequency from mixer 25, an amplifier 27, and a phase/frequency detector 28. The reference frequency applied to detector 28 is taken from one of oscillators 29 or 30 via a two-pole two-way switch S5, depending upon whether the transceiver is in transmit or receive mode. The control signal output of detector 28 is passed via low pass loop filter 31 to the control input of VCO 6. The mixer 25 and filter 26 are such as to generate a difference frequency at the output of filter 26 as follows:-

1) On receive, the seventh harmonic of the output frequency of multiplier 13 at 1016.575 MHz minus the receive output frequency of oscillator 6 at 1021.975 MHz, giving a difference frequency of 5.4 MHz; and 2) On transmit, the sixth harmonic of the output frequency of multiplier 13 at 871.35 MHz minus the transmit output frequency of oscillator 6 at 866.05 MHz, giving a difference frequency of 5.3 MHz.

It will be noted that the sum of these difference frequencies $(5.4 + 5.3)$ MHz evaluates to the second IF frequency of 10.7 MHz.

The phase lock loop 21 has to be fast acting in order firstly, to correctly track the frequency modulation applied to it at, typically, 80 Kbits/second, and secondly, to follow the rapid alternations between transmit and receive frequencies which occur during operation of the transceiver. This frequency changeover between transmit and receive has to be accomplished in as short a time as possible, for example 10 μS, in order to allow a sufficient duration of steady reception or transmission. This rapid settling of the loop is achieved by using high reference frequencies in the range 3.3 to 7.4 MHz. Specifically, for the frequency under discussion, reference oscillator 29 has an output frequency of 5.4 MHz, and reference oscillator 30 has an output frequency of 5.3 MHz. This allows the phase lock loop 21 to settle quickly because the period of the reference cycle is small (in the range 150 to 330 nS). A typical phase lock loop will take of the order of 30 reference cycles to achieve phase lock, so the longer the period of the reference cycle, the longer will be the time taken to stabilise the loop. A long reference period such as 10 μS (corresponding to a 100 KHz reference frequency) is not a practical proposition if, as in the present case, a 10 μS settle time is to be realized.

The loop 21 is of the mixer type in which the controlled frequency is offset from the reference frequency, or a multiple thereof, by a further frequency. This distinguishes from the more common divider type loop in which the controlled frequency is a multiple of the reference frequency. In the present case, the VCO 6 is offset from the reference frequency by either the sixth harmonic of 145.225 MHz on transmit, (i.e. 871.35 MHz), or with the seventh harmonic on receive (i.e. 1016.575 MHz) in the mixer 25. These harmonic frequencies are generated in the non-linear mixing process in mixer 25. No preselection of harmonics is necessary (though possible) for the proper function as only the harmonic close enough to the approximate unlocked frequency of the VCO 6 is able to produce a beat frequency in the range 3.3 to 7.4 MHz which is selected by the mixer filter 26.

The actual reference frequency used and the sense of presentation to the detector 28 is determined by whether the transceiver is in transmit or receive. The sense and actual frequency are changed between transmit and receive by means of switch S5 so that an offset of the sum of the reference frequencies plus the difference between the adjacent harmonics of 145.225 MHz is generated. The reference frequencies are always arranged here to add up to 10.7 MHz and the difference between adjacent harmonics is of course the original frequency of 145.225 MHz so that the offset between the transmit frequency and the receive frequency is always 155.925 MHz (or 134.525 MHz if the senses of the transmit and receive loops had been reversed).

This frequency of 155.925 MHz thus becomes the first IF in the dual conversion receiver section. As already explained, the first IF of 155.925 MHz is converted down to the second IF of 10.7 MHz by mixing with the 145.225 MHz second local oscillator frequency derived from the fifth harmonic of the output of crystal oscillator 11.

The two reference frequency oscillators take the form of VCO's 29, 30 which are locked to multiples of a low reference frequency of 100 KHz by respective phase lock loops 32, 33 using programmable dividers 34, 35. The phase lock loop 32 comprises, in addition to oscillator 29, the divider 34, loop filter 36 and phase-/frequency detector 38. Likewise, the loop 33 comprises oscillator 30, divider 35, loop filter 39 and phase/frequency detector 42. Note that the division ratios are arranged to total 107 so that the derived reference frequencies always add up to 10.7 MHz. The 100 KHz reference frequency for loops 32, 33 is derived by fixed division by 72 in a divider 40 from a local clock frequency of 7.2 MHz generated by a crystal oscillator 41.

The switch S5 selects as the two inputs to the phase-/frequency detector 28 the output from amplifier 27 together with one of the outputs from oscillator 29 or 30, depending upon whether the transceiver is in receive mode or transmit mode. The switch is also connected in such a way as to reverse the sense of the input connection to detector 28 according to which mode is selected.

Means (not shown) are provided for switching the switches S1, S3, S4 and S5 at the duplex changeover rate—for example 1.3 KHz to effect alternation between the transmit and receive functions. It has been found that the above-described transceiver is capable of rapidly and repeatedly alternating between transmit and receive functions and is therefore well suited to time division duplex operation. The transceiver is able to meet the target of 10 ηS changeover time and is thus well capable of operating within existing standards of an approximately 1.3 KHz transmit/receive alternation frequency, corresponding to a 375 μS transmit/receive period, this comprising a data portion of 312.5 μS duration, an identity data portion, and a changeover portion.

What is claimed is:

1. A time division duplex transceiver comprising a transmitter section and a receiver section;
   wherein the transmitter section includes common circuitry which is common to circuitry in the receiver section;
   wherein switch means are provided for switching the common circuitry alternately between the two sections at a transmit/receive alternation frequency;
   wherein the receiver section is of the superheterodyne type and comprises a local oscillator and a mixer, and an IF stage, said mixer receiving an incoming signal from an aerial and a signal from the local oscillator, which signals are mixed to produce a difference frequency for application to the IF stage, and wherein the transmitter section comprises an oscillator which is common to the local oscillator in the receiver section and an RF amplifier for amplifying the output of said oscillator for application to the aerial;
   wherein the local oscillator is switchable between a first frequency for receive and a second frequency for transmit, and wherein the frequency difference between said first frequency and said second frequency is equal to the frequency of the IF stage, or a multiple thereof;
   wherein the local oscillator comprises a voltage controlled oscillator VCO forming part of a main phase locked loop, said phase locked loop further comprising a phase detector for detecting the phase difference between a first input derived from the output of the VCO and a second input derived from a reference oscillator, and a loop filter for low pass filtering the output of said phase detector for application to the frequency control input of said VCO;
   and wherein the reference oscillator for the main phase locked loop comprises a crystal controlled oscillator having switchable output frequencies for transmit and receive.

2. A transceiver as claimed in claim 1 wherein the crystal controlled reference oscillator itself comprises two further phase locked loops, each loop incorporating a programmable divider whose division ratio is set, one for transmit and one for receive, and a switch means for selecting the output from one or the other of said further phase locked loops depending upon whether the transceiver is in a transmit mode or a receive mode for application to the main phase locked loop.

3. A transceiver as claimed in either one of claims 1 or 2 in which the main phase locked loop is of the mixer type and additionally incorporates a mixer which mixes the VCO output frequency with the output from a further oscillator, and a filter means for filtering the frequency difference output from said mixer for application to the phase detector.

4. A transceiver as claimed in either one of claims 1 or 2, wherein the receiver section is of the dual conversion type and comprises a further second local oscillator, a further second mixer and a further second IF stage, the second mixer receiving a signal from the first IF stage and a signal from the second local oscillator, which signals are mixed to produce a difference frequency for application to the second IF stage.

5. A time division duplex tranceiver comprising a transmitter section and a receiver section, wherein the transmitter section includes common circuitry which is common to circuitry in the receiver section, and wherein switch means are provided for automatically switching the common circuitry alternately between the two sections at a predetermined transmit/receive alternation frequency;
   wherein the receiver section is of the superheterodyne type and comprises a local oscillator and a mixer, and an IF stage, said mixer receiving an incoming signal from an aerial and a signal from the local oscillator, which signals are mixed to produce a difference frequency for application to the IF stage, and wherein the transmitter section comprises an oscillator which is common to the local oscillator in the receiver section and an RF amplifier for amplifying the output of said oscillator for application to the aerial;
   wherein the local oscillator is switchable between a first frequency for receive and a second frequency for transmit, and wherein the frequency difference between said first frequency and said second frequency is equal to the frequency of the IF stage, or a multiple thereof;

wherein the local oscillator comprises a voltage controlled oscillator VCO forming part of a main phase locked loop, said phase locked loop further comprising a phase detector for detecting the phase difference between a first input derived from the output of the VCO and a second input derived from a reference oscillator, and a loop filter for low pass filtering the output of said phase detector for application to the frequency control input of said VCO; and wherein the reference oscillator for the main phase locked loop comprises a crystal controlled oscillator having switchable output frequencies for transmit and receive.

6. A transceiver as claimed in claim 5 wherein the crystal controlled reference oscillator itself comprises two further phase locked loops, each loop incorporating a programmable divider whose division ratio is set, one for transmit and one for receive, and a switch means for selecting the output from one or the other of said further phase locked loops depending upon whether the transceiver is in a transmit mode or a receive mode for application to the main phase locked loop.

7. A transceiver as claimed in either one of claims 5 or 6 in which the main phase locked loop is of the mixer type and additionally incorporates a mixer which mixes the VCO output frequency with the output from a further oscillator, and a filter means for filtering the frequency difference output from said mixer for application to the phase detector.

8. A transceiver as claimed in any one of claims 5 or 6, whereing the receiver section is of the dual conversion type and comprises a further second local oscillator, a further second mixer and a further second IF stage, the second mixer receiving a signal from the first IF stage and a signal from the second local oscillator, which signals are mixed to produce a difference frequency for application to the second IF stage.

9. A time division duplex transceiver comprising a transmitter section and a receiver section;

wherein the transmitter section includes common circuitry which is common to circuitry in the receiver section;

wherein switch means are provided for switching the common circuitry alternately between the two sections at a transmit/receive alternation frequency;

wherein the receiver section is of the superheterodyne type and comprises a local oscillator and a mixer, and an IF stage, said mixer receiving an incoming signal from an aerial and a signal from the local oscillator, which signals are mixed to produce a difference frequency for application to the IF stage, and wherein the transmitter section comprises an oscillator which is common to the local oscillator in the receiver section and an RF amplifier for amplifying the output of said oscillator for application to the aerial;

wherein the local oscillator is switchable between a first frequency for receive and a second frequency for transmit, wherein the frequency difference between said first frequency and said second frequency is equal to the frequency of the IF stage, or a multiple thereof;

wherein said transmitter section transmits and the receiver section receives at the same frequency;

wherein the local oscillator comprises a voltage controlled oscillator VCO forming part of a main phase locked loop said phase locked loop further comprising a phase detector for detecting the phase difference between a first input derived from the output of the VCO and a second input derived from a reference oscillator, and a loop filter for low pass filtering the output of said phase detector for application to the frequency control input of said VCO; and wherein the reference oscillator for the main phase locked loop comprises a crystal controlled oscillator having switchable output frequencies for transmit and receive.

10. A transceiver as claimed in claim 9 wherein the crystal controlled reference oscillator itself comprises two further phase locked loops, each loop incorporating a programmable divider whose division ratio is set, one for transmit and one for receive, and a switch means for selecting the output from one or the other of said further phase locked loops depending upon whether the transceiver is in a transmit mode or a receive mode for application to the main phase locked loop.

11. A transceiver as claimed in either one of claims 9 or 10 in which the main phase locked loop is of the mixer type and additionally incorporates a mixer which mixes the VCO output frequency with the output from a further oscillator, and a filter means for filtering the frequency difference output from said mixer for application to the phase detector.

12. A transceiver as claimed in any one of claims 9 or 10, wherein the receiver section is of the dual conversion type and comprises a further second local oscillator, a further second mixer and a second IF stage, the second mixer receiving a signal from the first IF stage and a signal from the second local oscillator, which signals are mixed to produce a difference frequency for application to the second IF stage.

* * * * *